No. 621,276. Patented Mar. 14, 1899.
H. O. PAUL.
HOSE COUPLING.
(Application filed Oct. 5, 1897.)
(No Model.)
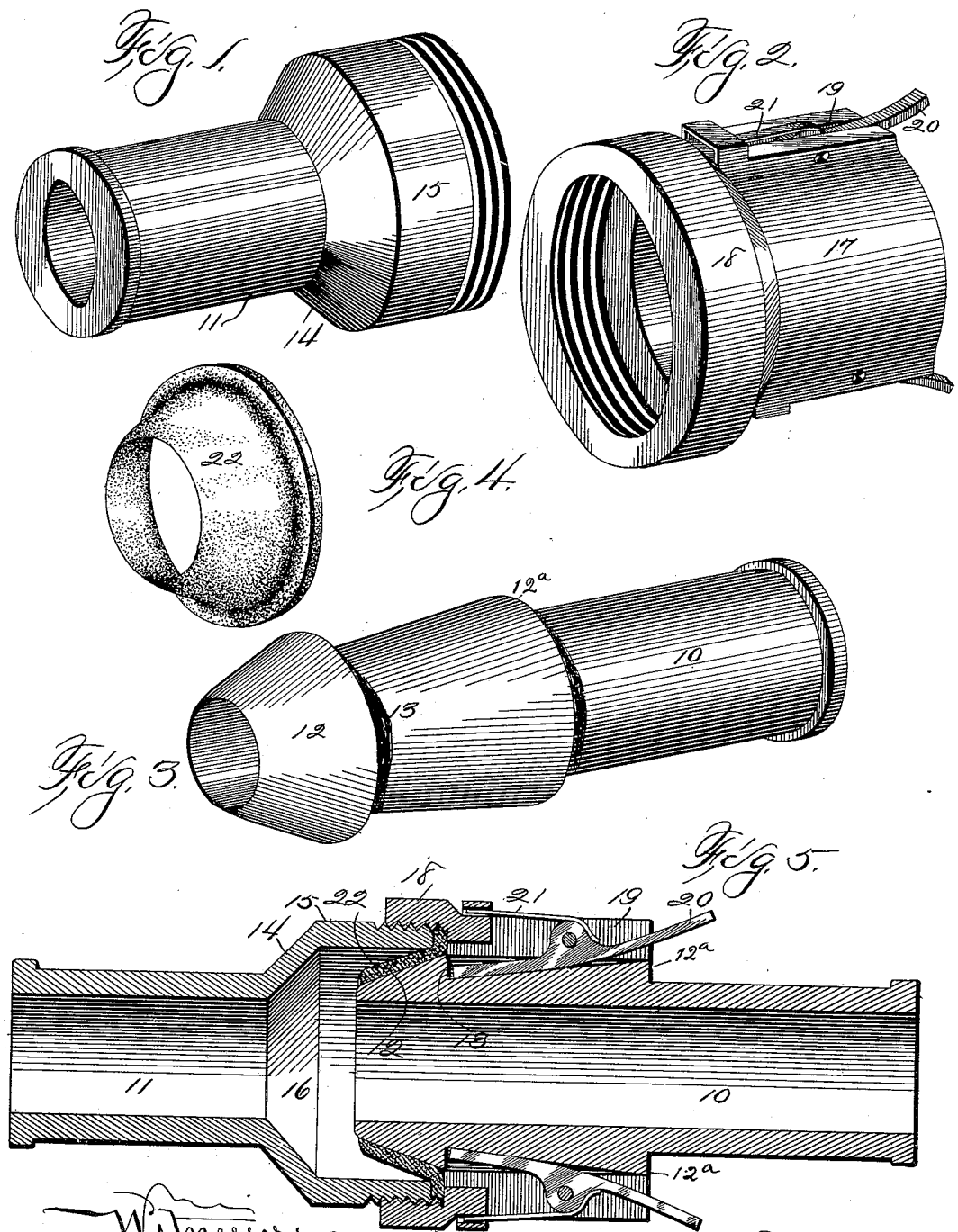

UNITED STATES PATENT OFFICE.

HENRY O. PAUL, OF CLEAR LAKE, IOWA.

HOSE-COUPLING.

SPECIFICATION forming part of Letters Patent No. 621,276, dated March 14, 1899.

Application filed October 5, 1897. Serial No. 654,189. (No model.)

*To all whom it may concern:*

Be it known that I, HENRY O. PAUL, a citizen of the United States, residing at Clear Lake, in the county of Cerro Gordo and State of Iowa, have invented a new and useful Hose-Coupling, of which the following is a specification.

The object of this invention is to provide a hose-coupling of simple, cheap, strong, and durable construction which may be readily and quickly coupled or uncoupled without screwing or unscrewing any of the parts thereof and which is also made positively water-tight.

My invention consists in the construction, arrangement, and combination of the various parts of the device, as hereinafter set forth, pointed out in my claims, and illustrated in the accompanying drawings, in which—

Figure 1 shows a detail perspective view of a part of the hose-coupling to which the hose is attached. Fig. 2 shows a like view of a collar which is attached to the part shown in Fig. 1. Fig. 3 shows a like view of the opposite part of the hose-coupling to which the hose is attached. Fig. 4 shows a like view of a washer made of flexible material. Fig. 5 shows a longitudinal sectional view of the complete hose-coupling.

Referring to the accompanying drawings, the reference-numerals 10 and 11 are used to indicate two parts made of metal and having their outer end portions designed to be inserted in a flexible hose. On the end of the part 10 is an extended cone-shaped surface 12, and the reference-numeral 13 indicates a shoulder, the functions of which will be hereinafter described. The inner end portion of the part 11 flares outwardly at 14 and then extends parallel with the body portion of the part 11 at 15 to form the chamber 16, the said extension 15 being externally screw-threaded.

The reference-numeral 17 indicates a cylindrical collar having at its one end the internally-screw-threaded extension 18 to engage with the screw-threaded extension 15 of the part 11. Two slots 19 are extended longitudinally through the collar 17, and within these slots the pawls 20 are pivotally mounted. When the parts 10 and 11 are coupled, as shown in Fig. 5, one end of each of the pawls 20 engages the shoulder 13 of the part 10, and thus the part 10 is prevented from being uncoupled from the other parts of the device when the pawls 20 are in this position. Springs 21 are connected with the pawls 19 to normally hold them in position to engage the shoulder 13.

To provide a water-tight connection, I have used an apertured washer 22, made of rubber or other flexible material, which is clamped between the extension 15 of the part 11 and the collar 17. The outer edge of the washer has a flange extending outward to engage the annular internal shoulder of the collar 17 and the face of the end of the part 16, and its cone-shaped body conforms in shape and size with the inclined surface 12, against which it rests. In practical use it is obvious that the pressure of the water in the chamber 16 will force the washer 22 firmly against the inclined surface 12, so that none of the water can pass between the washer and the inclined surface, and as this is the only possible way that the water could escape from the device it is obvious that a perfect water-tight coupling is provided.

It is apparent that lateral movement of the section 10 relative to the washer and cylindrical collar 17 must be prevented in order to preserve a due water-tight contact between the washer and the conical head 12 of said section, and for this purpose I provide the latter with a second shoulder $12^a$, which when section 10 is inserted in collar 17 bears against the inner surface of the latter. In this manner the section 10 is held in due longitudinal alinement with the other parts of the coupling.

The parts of the hose-coupling are connected as follows: The washer 22 is placed in position against the extension 15, and then the collar 17 is screwed to the extension 15 until the edges of the washer are securely clamped between the said extension and the collar. The washer 22 and the collar 17 are ordinarily left attached to the part 11 in the manner just described, so that the part 10 may be coupled to the other parts of the device at any time. The said part 10 is coupled by placing it within the collar 17 and then moving it toward the part 11 until the pawls 20 engage with the shoulder 13, whereupon the said part 10 will be prevented from being withdrawn from the collar. To uncouple the device, the outer ends of the pawls 20 are moved toward the part 10, which will obviously disengage the opposite ends of the pawls from the shoulder 13 and allow the part 10 to be withdrawn from the collar. Thus a hose-coupling is provided which may be readily and quickly coupled or uncoupled without screwing or unscrewing any of the parts thereof and which is also made perfectly water-tight.

Having thus described the hose-coupling, what I claim as my invention, and desire to secure by Letters Patent of the United States therefor, is—

1. The combination of the detachable coupling-section 10, having a conical shouldered head and a second or rear shoulder located back of the first, with the elastic apertured washer, the coupling-section 11 and cylindrical collar 17, detachably connected, the rear shoulder of section 10, being located within the collar 17, and locking-pawls attached to the latter and engaging the first shoulder of section 10, as shown and described.

2. The combination, with the coupled sections 11 and 17, the latter having longitudinal slots as specified, and the elastic apertured washer or diaphragm, held between said sections, of the detachable section 10, having a conical shouldered head, and lever, spring-pressed locking-pawls pivoted in the aforesaid slots of part 17 and having tails or shanks which project outwardly and are accessible on the outer side of the collar, as shown and described.

3. A hose-coupling, comprising a part 10 having the inclined surface 12 and shoulder 13 thereon, a part 11 flared outwardly at 14 and then extended parallel with the body portion of the part 11 at 15, the said extension 15 being screw-threaded, a collar having slots extended longitudinally therethrough, and also having a screw-threaded extension on one end to engage with the extension 15 of the part 11, pawls pivotally mounted within the said slots and designed to engage with the shoulder 13 of the part 10, spring for holding the pawls in position to engage the said shoulders, and a washer 22 having its outer edge clamped between the extension 15 and the collar, and its inner edge arched to conform to the shape of the inclined surface 12, all arranged and combined substantially in the manner set forth and for the purposes stated.

HENRY O. PAUL.

Witnesses:
D. W. HURN,
H. E. PALMETER.